(12) United States Patent
Ueki

(10) Patent No.: US 7,375,825 B2
(45) Date of Patent: May 20, 2008

(54) LIGHT INTENSITY RATIO ADJUSTMENT FILTER FOR AN INTERFEROMETER, INTERFEROMETER, AND LIGHT INTERFERENCE MEASUREMENT METHOD

(75) Inventor: Nobuaki Ueki, Saitama (JP)

(73) Assignee: Fujinon Corporation, Saitama (JP)

( * ) Notice: Subject to any disclaimer, the term of this patent is extended or adjusted under 35 U.S.C. 154(b) by 239 days.

(21) Appl. No.: 11/204,152

(22) Filed: Aug. 16, 2005

(65) Prior Publication Data
US 2006/0066874 A1    Mar. 30, 2006

(30) Foreign Application Priority Data
Sep. 24, 2004   (JP)   .............. 2004-276434

(51) Int. Cl.
*G01B 11/02*    (2006.01)
(52) U.S. Cl. .................................... 356/514
(58) Field of Classification Search ............... 356/489, 356/495, 511–515, 585, 587; 359/580
See application file for complete search history.

(56) References Cited

U.S. PATENT DOCUMENTS

| | | | |
|---|---|---|---|
| 3,998,553 A * | 12/1976 | Hunter et al. ............... 356/513 |
| 4,732,483 A * | 3/1988 | Biegen ........................ 356/495 |
| 4,820,049 A | 4/1989 | Biegen | |
| 4,955,719 A * | 9/1990 | Hayes ........................ 356/514 |
| 5,048,942 A * | 9/1991 | Ohbayashi .................. 359/513 |
| 5,091,244 A * | 2/1992 | Biornard ..................... 428/216 |
| 5,337,191 A * | 8/1994 | Austin ........................ 359/885 |
| 5,521,759 A * | 5/1996 | Dobrowolski et al. ...... 359/585 |
| 6,018,990 A * | 2/2000 | Ueki ........................... 73/104 |
| 6,208,680 B1 * | 3/2001 | Chirovsky et al. ............ 372/96 |
| 6,992,779 B2 * | 1/2006 | Ueki ........................... 356/512 |
| 7,030,995 B2 * | 4/2006 | De Groot et al. ........... 356/512 |
| 2003/0026014 A1* | 2/2003 | Kunii ......................... 359/888 |

OTHER PUBLICATIONS

Clapham, P.B. et al., "Surface-coated reference flats for testing fully aluminized surfaces by means of the Fizeau interferometer", *J. Sci. Instrum.*, 1967, vol. 44, pp.889-902.

Netterfield, R.P. et al., "Coating requirements for the reference flat of a Fizeau interferometer used for measuring from uncoated to highly reflecting surfaces", *SPIE*, May 1999, vol. 3738, pp. 128-135.

* cited by examiner

*Primary Examiner*—Patrick Connolly
*Assistant Examiner*—Scott M Richey
(74) *Attorney, Agent, or Firm*—Birch, Stewart, Kolasch & Birch, LLP

(57) ABSTRACT

The light intensity ratio adjustment filter is placed between the reference surface and the sample surface of the interferometer. This light intensity ratio adjustment filter has a light intensity ratio adjustment film including an optical reflection-absorption layer and a dielectric anti-reflection layer on the surface of a transparent substrate made of glass on the sample side, and an optical anti-reflection film on the reference surface side, and acts so as to reflect part of the incident light from the surface opposite the reference surface, and after absorbing part of the remaining light, transmit the remainder towards the sample, and furthermore, absorb part of the light returned from the sample while controlling reflection, and transmit the remainder in the direction of the reference surface as the sample light.

11 Claims, 3 Drawing Sheets

LIGHT INTENSITY RATIO ADJUSTMENT FILTER FOR AN INTERFEROMETER, INTERFEROMETER, AND LIGHT INTERFERENCE MEASUREMENT METHOD

RELATED APPLICATIONS

This application claims the priority of Japanese Patent Application No. 2004-276434 filed on Sep. 24, 2004, which is incorporated herein by reference.

BACKGROUND OF THE INVENTION

1. Field of the Invention

The present invention relates to a light intensity ratio adjustment filter placed between a sample and a reference surface of a Fizeau interferometer, an interferometer employing this filter, and a method of measuring light interference, and more particularly to a light intensity ratio adjustment filter employed in an interferometer used when exchanging and measuring samples for which optical reflectance differs greatly, for example, objects of high reflectance such as metal surfaces, and low reflectance objects of such as glass surfaces.

2. Description of the Prior Art

With interferometers, it is generally known that satisfactory high contrast interference wave information is obtained with a small difference in optical intensity when sample light from the sample and reference light are multiplexed, and that the range of difference of, for example, the ratio of optical intensity of the sample light and the reference light is between approximately 5 and $\frac{1}{5}$.

Therefore, in a situation in which low reflectance samples must be exchanged with high reflectance samples and measured sequentially, a method is employed in which the reflectance of the reference surface is set to approximately the same as the reflectance of the low reflectance sample, and when measuring the high reflectance sample, an optical attenuation filter is inserted between the reference surface and the sample surface, to attenuate the sample light.

However, with this method, while there is no problem when measuring flat sample surfaces, problems arise in that, when measuring spherical sample surfaces it is difficult to secure space in which to insert the optical attenuation filter between the reference surface and the sample surface, and to ensure that light reflected from the surface of the optical attenuation filter does not negatively effect measurement, the optical attenuation filter is inserted in an inclined manner, and therefore measurement accuracy is lost due to aberration occurring in the sample light (see U.S. Pat. No. 4,820,049 (hereafter referred to as 'Document 1')).

Therefore, a method is also known in which the base material of the optical attenuation filter is an extremely thin synthetic resin film (pellicle) on which the optical attenuation coating is applied. Thus, the restrictions on space for insertion of the optical attenuation filter are alleviated, and aberration is of an extent which can be ignored. However, an optical attenuation filter manufactured in this manner is brittle and delicate, and not readily inserted and removed from the light path (see Document 1).

Furthermore, a further method is also known in which the reference surface is coated with a light intensity ratio adjustment film, and the light intensity ratio of the reference light reflected from the reference surface and the sample light passing through the light intensity ratio adjustment film, reflected by the sample surface, and passed again through the light intensity ratio adjustment film, is approximately 1.

However, while the problems related to the optical attenuation filter are solved with this method, there is a new problem in that a plurality of very expensive reference surfaces must be prepared to suit the reflectance of the sample surface, and measurement criteria differ with samples of differing reflectance during measurement, and it is difficult to treat correlation of the measurement results (see Document 1).

To solve this problem, it is possible to achieve a range of light intensity ratio adjustment in which satisfactory high contrast interference wave information can be obtained for the light intensity ratio of sample light and reference light with measurement of both low reflectance samples and high reflectance samples by coating the reference surface with a light intensity ratio adjustment film having a reflectance intermediate between the low reflectance sample and the high reflectance sample (intermediate reflectance).

However, with this method, there is a problem in that, when the light returned from the sample passes through the reference surface, since the reflectance of the reference surface is intermediate reflectance, the intensity of the light reflected again in the direction of the sample increases, reflected interference occurs repeatedly between the sample surface and the reference surface (multiple interference), and phase analysis of the interference fringe obtained is difficult.

An experiment has therefore been conducted in which the structure of the light intensity ratio adjustment film of the reference surface having the intermediate reflectance is modified to ensure that multiple interference does not occur between the sample surface and the reference surface.

For example, a Fizeau interferometer in which the reference surface is coated with a light intensity ratio adjustment film of intermediate reflectance is disclosed in J. Sci. Instrum., 1967, Vol. 44, pp. 899-902 (Surface-coated reference flats for testing fully aluminized surfaces by means of the Fizeau Interferometer)(hereafter referred to as 'Document 2'), SPIE, 1999, Vol. 3738, pp. 128-135 (Coating requirements for the reference flat of a Fizeau interferometer used for measuring from uncoated to highly reflecting surfaces)(hereafter referred to as 'Document 3'), and Document 1. These light intensity ratio adjustment films are comprised of, for example, one optical reflection-absorption layer, and one or two dielectric anti-reflection layers, and increase the reflectance of the incident measurement light at the reference surface, and absorb and attenuate light returned from the sample and passing through the reference surface due to the optical reflection-absorption effect of the optical reflection-absorption layer and the anti-reflection effect of the dielectric anti-reflection layers. On the other hand, the light intensity ratio adjustment film comprises a film preventing reflection to ensure that the incident light returned from the sample is not reflected in the direction of the sample and causing multiple interference.

Thus, a reduction in the accuracy of phase information analysis due to light reflected by the reference surface and returned again to the sample surface may be prevented, and the light intensity ratio of sample light and reference light at the reference surface may be readily set to be within the range (for example, between approximately 5 and $\frac{1}{5}$) centered on 1, irrespective of the reflectance ratio of the sample.

The optical reflection-absorption layer is comprised of metal layers such as nickel-chrome or bismuth and the like, and the dielectric anti-reflection layers are comprised of metal oxide layers such as titanium oxide or bismuth oxide and the like. One aspect of such a film configuration is known as 'C&D Coat'.

Since high contrast interference wave information unaffected by multiple interference can be obtained for a variety of samples of various differing optical reflectance using a single light intensity ratio adjustment film with the technology disclosed in Document 1, Document 2, and Document 3, this technology is effective in increasing the efficiency of measurement and the accuracy of measurement.

However, with the technology disclosed in these documents, since the reference surface is coated with the light intensity ratio adjustment film, this film cannot be withdrawn from the light path when it is desired to eliminate the effects due to this film. In other words, when the reference surface and sample surface are both low reflectance glass surfaces, satisfactory interference wave information of good contrast may be obtained without use of the light intensity ratio adjustment film, and conversely, wavefront aberration of the light intensity ratio adjustment film is superimposed on the interference wave information due to a non-uniform distribution of transmissivity in the light intensity ratio adjustment film. With this conventional technology, therefore, it can be said that the interference wave information of low reflectance samples is sacrificed.

Furthermore, with this conventional technology, since the reference surface is coated directly with the light intensity ratio adjustment film, there is the concern that the surface accuracy of the reference surface may be reduced due to the effects of heat applied during application of the coating, and by the effects of membrane stress of the attached light intensity ratio adjustment film, and the like.

Furthermore, with the interferometer configured to allow measurement of sample surfaces with light of differing wavelengths, since the reflection, transmission, and absorption characteristics of the light intensity ratio adjustment film are wavelength-dependent, depending upon the selected wavelength, it becomes difficult to contain the ratio of optical intensity of the sample light and the reference light within a range centered on 1 (for example, between approximately 5 and $1/5$), and to control multiple reflection between the reference surface and the sample surface. Thus, there is the concern that a plurality of types of expensive reference surfaces must be exchanged in use.

SUMMARY OF THE INVENTION

It is an object of the present invention to provide an optical element for obtaining high contrast interference wave information unaffected by multiple interference using single light intensity ratio adjustment means for a variety of samples of various differing optical reflectance.

It is a further object of the present invention to provide an optical element for eliminating the effects of wavefront aberration of the light intensity ratio adjustment means from the sample surface interference wave information.

It is a further object of the present invention to provide an optical element for preventing deterioration in accuracy of the surface accuracy of the reference surface due to the effects of the light intensity ratio adjustment film.

It is a further object of the present invention to provide an optical element for accommodating measurement using differing wavelengths with a single reference surface.

And finally, it is an object of the present invention to provide a light intensity ratio adjustment filter such as optical element stated above for an interferometer, an interferometer using this light intensity ratio adjustment filter, and a light interference measurement method.

The light intensity ratio adjustment filter for an interferometer related to the present invention comprising a light intensity ratio adjustment film of a multi-layered film structure comprising at least one optical reflection-absorption layer and at least one dielectric anti-reflection layer laminated in that order as seen from the reference surface and attached to a side of a transparent substrate opposite the sample or to a side of the transparent substrate opposite the reference surface, wherein the light intensity ratio adjustment filter is placed so as to be freely inserted and removed between the sample and reference surface of a Fizeau interferometer inducing interference between sample light from the sample and reference light from the reference surface, and wherein the light intensity ratio adjustment film reflects part of the incident light from the surface of a transparent substrate opposite the reference surface, and after absorbing part of the remaining light, transmits the remainder towards the sample, and absorbs part of the light returned from the sample and incident from the surface side opposite the sample while controlling reflection, and transmits the remainder in the direction of the reference surface as the sample light.

'Sample light from the sample' includes not only reflected light from the sample, but also light transmitting through the sample.

Furthermore, it is desirable that the optical reflection-absorption layer comprises a metallic layer, and that the dielectric anti-reflection layer comprises metallic oxide layers.

Furthermore, it is desirable that the metallic layer comprises nickel-chrome or bismuth, and that the dielectric anti-reflection layer comprises titanium oxide or bismuth oxide.

Furthermore, it is desirable that an optical anti-reflection film is attached to the surface of the transparent substrate either opposite the reference surface or opposite the sample to which the light intensity ratio adjustment film is not attached.

Furthermore, it is desirable that the optical anti-reflection film comprises a layer of alternate films of ZnS and $MgF_2$.

Furthermore, the interferometer of the present invention has the afore-mentioned light intensity ratio adjustment filter for an interferometer.

In this case, a configuration is desirable in which the light intensity ratio of the reference light in relation to the sample light at the reference surface is within a range of 5 and $1/5$.

Furthermore, it is desirable that the light intensity ratio adjustment filter for an interferometer can be freely inserted and removed from the light path.

Furthermore, a configuration is desirable in which the surface of the light intensity ratio adjustment filter for an interferometer is inclined towards the surface perpendicular to the optical axis of the interferometer.

Furthermore, the sample can form a spherical shape.

Furthermore, the light interference measurement method of the present invention is a light interference measurement method for obtaining interference wave information for a sample using the afore-mentioned interferometer, wherein a measurement value adjustment reference plate having a surface reflectance equivalent to the reference surface is placed at sample position, and the light intensity ratio adjustment filter for an interferometer is inserted in the light path between the reference surface and the measurement value adjustment reference plate, to obtain primary interference wave information; the sample to be measured is placed at the sample position, and the light intensity ratio adjustment filter for an interferometer is inserted in the light path between the reference surface and the sample to be measured, to obtain secondary interference wave information;

and the difference information between the secondary interference wave information and the primary interference wave information is then computed, to obtain interference wave information for the sample to be measured.

DESCRIPTION OF THE PREFERRED EMBODIMENTS

The embodiments according to the present invention are described in detail below in reference to the figures. The interferometer of the present embodiment is a Fizeau interferometer mounting a LD (a semiconductor laser source), and uses the light radiated from the LD to observe interference wave information for sample surfaces having a variety of reflectance ratios.

Figure 1:
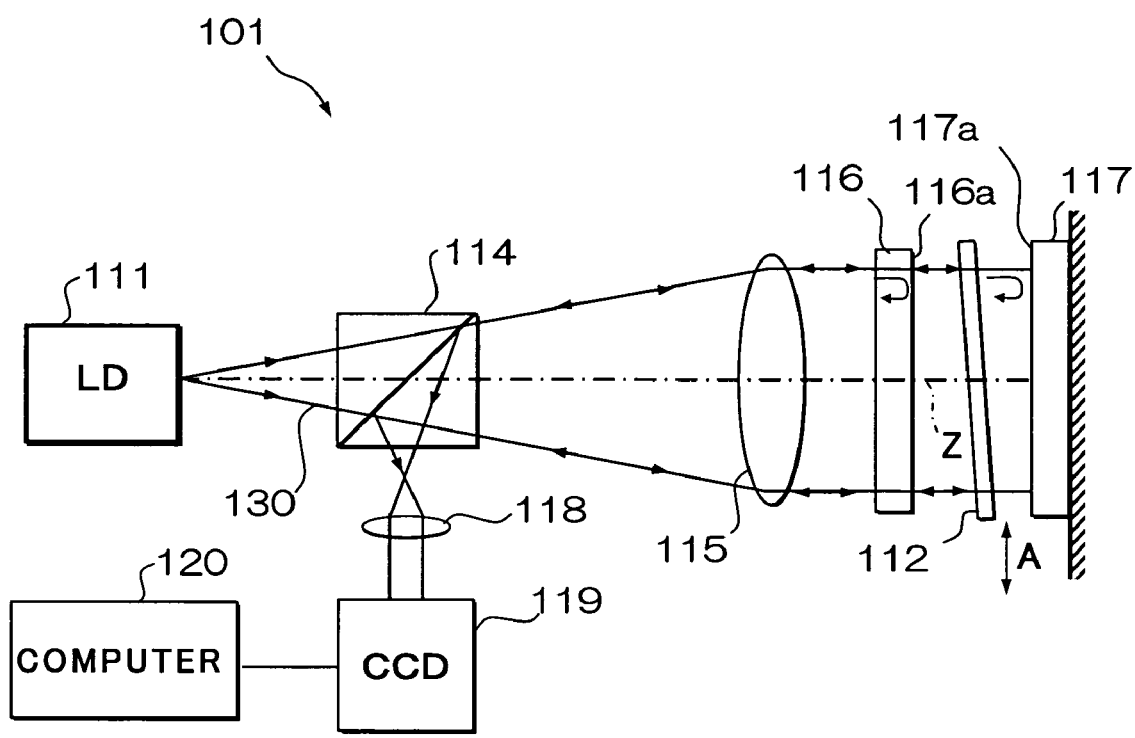
FIG. 1 is a schematic diagram of the interferometer according to one embodiment of the present invention.

FIG. 1 is a schematic diagram showing the configuration of the interferometer according to the present embodiment. This interferometer has a collimator lens 115 converting divergent laser light radiated from the LD 111 into parallel light, and a reference plate 116 transmitting laser light from the collimator lens 115 and reflecting part of that laser light at the reference plate 116a. Furthermore, the interferometer has a beam splitter 114 laterally reflecting part of the light returned via the collimator lens 115 and generating interference with the part of the light transmitting through the reference plate 116, reflected on the sample surface 117a of the sample 117, again incident on the reference plate 116, and reflected on the reference surface 116a, an imaging lens 118, and a CCD imaging unit 119. Furthermore, the CCD imaging unit 119 is connected to a computer 120, and a variety of image processing and arithmetical processing and the like (described below) are conducted in this computer 120.

Furthermore, the light intensity ratio adjustment filter 112 being the primary component of the present embodiment is positioned between the reference surface 116a and the sample surface 117a. This light intensity ratio adjustment filter 112 is comprised of a transparent glass substrate of a certain rigidity, and a light intensity ratio adjustment film including at least one optical reflection-absorption layer and at least one dielectric anti-reflection layer being applied to one surface, and an optical anti-reflection layer applied to the other surface.

This light intensity ratio adjustment film has a function to reflect part of the incident light from the surface of the transparent substrate opposite the reference surface, and after absorbing part of the remaining light, transmit the remainder towards the sample 117. Furthermore, the light intensity ratio adjustment film has a function to absorb part of the light returned from the sample 117 and incident from the surface opposite the sample, while controlling reflection and transmitting the remainder of the light towards the reference surface 116a as sample light, and has a layer configuration such that the light intensity ratio of the sample light and the reference light is contained within a range centered on 1 (a range in which the contrast of interference wave information is satisfactory, for example, between 5 and ⅕).

The optical reflection-absorption layer is comprised of metal layers such as nickel-chrome or bismuth and the like, and the dielectric anti-reflection layer is comprised of metal oxides such as titanium oxide or bismuth oxide and the like. The number of layers is not particularly restricted, and each layer may have at least one layer. Existing film configurations such as the C&D Coat and the like may be used. This C&D Coat is comprised of a bismuth optical reflection-absorption layer and a bismuth oxide dielectric anti-reflection layer laminated on a substrate in that order, and, for example, when using light of a wavelength of 546.1 nm, a thickness of the former of 7 nm, and a thickness of the latter of 25 nm, is used.

Furthermore, a dielectric anti-reflection layer of titanium oxide, an optical reflection-absorption layer of nickel-chrome, and a dielectric anti-reflection layer of titanium oxide laminated on the substrate in that order is also known as a film configuration having similar function, and, for example, when using light of a wavelength of 1064 nm, thicknesses of these three layers of, for example, 108 nm, 9.5 nm, and 80 nm are used.

Figure 2A:
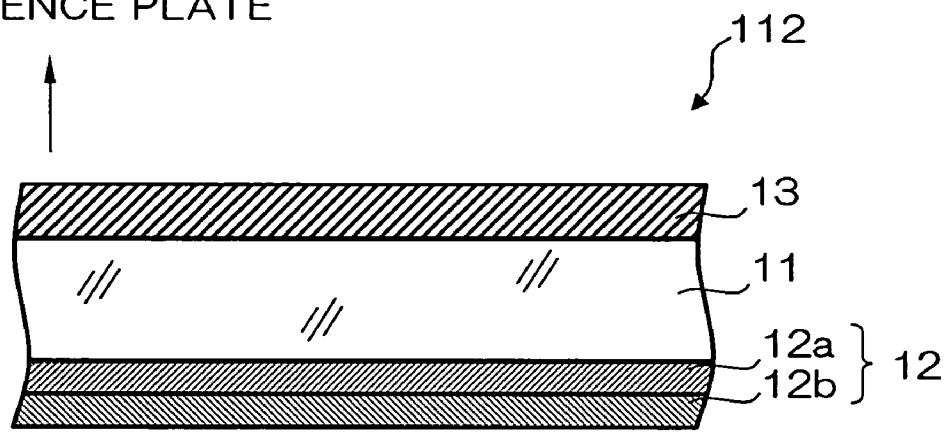
FIG. 2A and FIG. 2B are conceptual diagrams showing the layer configuration of the light intensity ratio adjustment filter for an interferometer according to one embodiment of the present invention.

FIG. 2A shows schematically the configuration of one aspect of the light intensity ratio adjustment filter 112, and shows the light intensity ratio adjustment film 12 laminated on one surface (sample 117 side) of the transparent glass plate 11, and a known optical anti-reflection film 13 (for example, alternate layers of ZnS and $MgF_2$) such as an AR Coat laminated on the other surface (reference surface 116a side). The C&D Coat is used as the light intensity ratio adjustment film 12 in this aspect, the optical reflection-absorption layer 12a comprised of a bismuth layer, and the dielectric anti-reflection layer 12b comprised of a bismuth oxide layer, being laminated on the transparent glass plate 11 (reference surface 116a side) in that order. The layers 12a and 12b of the light intensity ratio adjustment film 12 can be manufactured by a known film manufacturing method such as vapor deposition, spattering, or ion plating. Each layer of the optical anti-reflection film 13 can be manufactured using the same film manufacturing method.

In any case, the film configuration of the light intensity ratio adjustment filter 112 used in the present embodiment is required to control reflection of the light returned from the sample 117 while adjusting the intensity of the reference light and the sample light to within a range in which satisfactory contrast is obtained. However, in order to induce this action, the optical reflection-absorption layer 12a must be positioned on the reference surface 116a side of the dielectric anti-reflection layer 12b.

Thus, as a result of the light intensity ratio adjustment filter 112 being placed between the reference surface 116a and the sample surface 117a, high contrast interference wave information can be obtained using a single light intensity ratio adjustment filter 112 for samples 117 having various differing optical reflectance. Therefore, since measurement is possible with the light intensity ratio adjustment filter 112 inserted in the light path not only when measuring high reflectance samples, but also when measuring low reflectance samples, measurement with the light intensity ratio adjustment filter 112 remaining inserted in the light path is possible even in cases in which when rapid measurement is required and the like.

Furthermore, since the light intensity ratio adjustment film 12 is attached to a transparent glass plate 11 of a certain rigidity in the light intensity ratio adjustment filter 112, in comparison to the case in which the light intensity ratio adjustment film 12 is attached to a high-polymer synthetic resin film pellicle and the like, deterioration in quality due to heat when manufacturing the film by vapor deposition and the like is small, and furthermore, shock resistance is high. Furthermore, in some cases a flow of air is formed within the equipment to maintain cleanliness of the reference surface and the like, however, the initial form can be maintained even under such conditions without effect on interference wave information.

Furthermore, the light intensity ratio adjustment filter 112 is movable in the direction of the arrow A in the figure, and may be configured to be inserted in the light path during measurement of a high reflectance sample, and withdrawn from the light path during measurement of a low reflectance sample. Thus, during measurement of a low reflectance sample, measurement is not affected by wavefront aberration and the like of the light intensity ratio adjustment filter 112, and highly accurate interference wave information can be obtained.

Furthermore, as described above, an optical anti-reflection film 13 is formed on the reference surface side of the light intensity ratio adjustment filter 112, and the reflectance of the incident light from the reference surface side and sample surface side at this surface is reduced. Furthermore, the light intensity ratio adjustment filter 112 is inclined slightly relative to surface perpendicular to the optical axis Z to prevent the small amount of light reflected towards the reference surface side from the light intensity ratio adjustment filter 112 being superimposed on the interference wave information as noise.

A method of measuring light interference to obtain interference wave information of greater accuracy for high reflectance samples is described below.

Figure 3A:
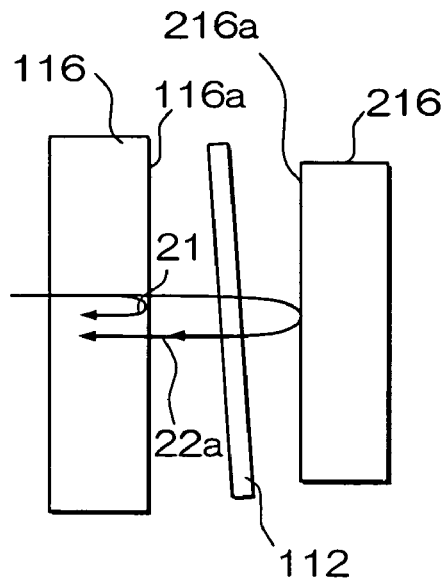
FIG. 3A and FIG. 3B are schematic diagrams describing the light interference measurement method according to one embodiment of the present invention.

Firstly, as shown in FIG. 3A, a corrective reference plate (equivalent to the measurement value adjustment reference plate described above, hereafter the same) 216 is placed at the position of the sample, and the light intensity ratio adjustment filter 112 is inserted in the light path between the reference surface 116a of the reference plate 116 and the corrective reference plate 216, interference is induced between the reflected light 22a from the reference surface 216a of the reference plate 216 and the reference light 21 from the reference surface 116a, and the primary interference wave information is obtained. The corrective reference plate 216 is comprised of a material having a similar reflectance as the reference plate 116 (normally a material of low reflectance such as glass and the like), and the corrective reference surface 216a is a flat surface of extremely high accuracy.

In this case, the light intensity ratio adjustment filter 112 is adjusted to be slightly inclined relative to these reference surfaces 116a and 216a to ensure that reference surface 116a and the corrective reference surface 216a are mutually parallel, and to prevent reflected light from the light intensity ratio adjustment filter 112 being superimposed as noise on the interference wave information.

The primary interference wave information obtained in this manner is stored in the memory of the computer 120 (see FIG. 1).

Figure 3B:
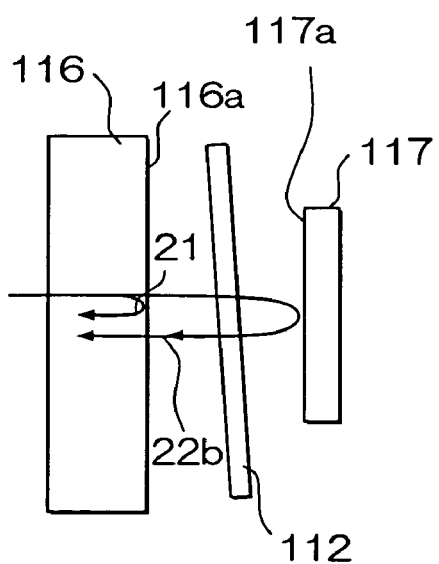

Next, as shown in FIG. 3B, a high reflectance sample 117 is placed at the position of the sample, the light intensity ratio adjustment filter 112 is inserted in the light path between the reference surface 116a and the high reflectance sample 117, interference is induced between the reflected light 22b from the sample surface 117a of the sample 117 and the reference light 21 from the reference surface 116a, and the secondary interference wave information is obtained.

In this case, as when obtaining the primary interference wave information, the light intensity ratio adjustment filter 112 is adjusted to be slightly inclined relative to these surfaces 116a and 117a to ensure that the reference surface 116a and the sample surface 117a are mutually parallel.

The secondary interference wave information obtained in this manner is also stored in the memory of the computer 120.

Arithmetical processing is then conducted in the computer 120 to subtract the primary interference wave information from the secondary interference wave information and cancel out the wavefront aberration occurring due to the light intensity ratio adjustment filter 112, and highly accurate interference wave information indicating the surface shape of the high reflectance sample surface 117a is obtained.

By using such a method, the light intensity ratio adjustment filter 112 can be used to improve the contrast of the interference wave information while improving the accuracy of the interference wave information, during measurement of high reflectance samples.

This method may be employed when improving the accuracy of the interference wave information even when the light intensity ratio adjustment filter 112 is used in measurement of low reflectance samples.

Figure 2B:
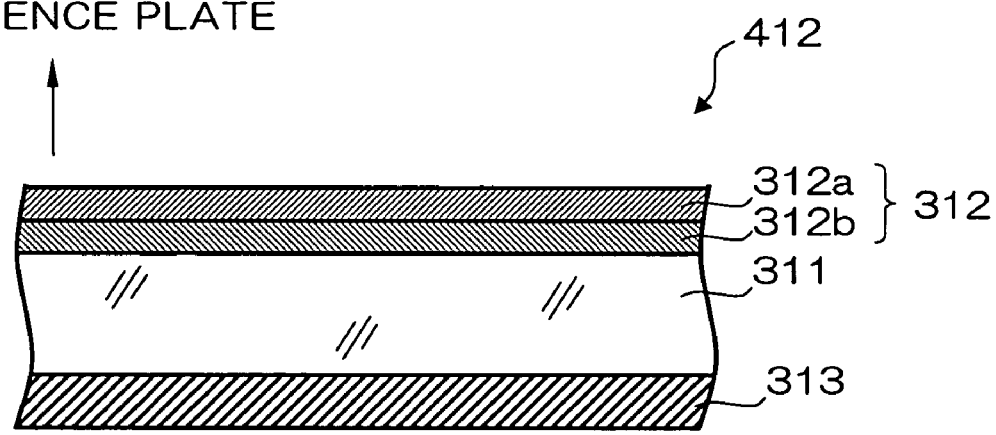

The light intensity ratio adjustment filter for an interferometer, the interferometer, and the light interference measurement method of the present invention are not limited to the afore-mentioned embodiment, and a variety of other aspects are possible. For example, the layer configuration of the light intensity ratio adjustment filter 412 as shown in FIG. 2B may be used in place of the layer configuration of the light intensity ratio adjustment filter 112 in the afore-mentioned embodiment as the practical disposition of the film of the light intensity ratio adjustment filter for an interferometer of the present invention. In other words, as shown in FIG. 2B, a configuration in which the light intensity ratio adjustment film 312 is laminated on the reference surface 116a side, and the optical anti-reflection film 313 is laminated on the sample 117 side, of the transparent glass plate 311, is also possible. As in the embodiment described above, the light intensity ratio adjustment film 312 is comprised of, for example, the dielectric anti-reflection layer (for example, a bismuth oxide layer) 312b and the optical reflection-absorption layer (for example, a bismuth layer) 312a laminated in that order on the surface of the transparent glass plate 311 opposite the reference surface. In this manner, even if the positions of the light intensity ratio adjustment film 312 and the optical anti-reflection film 313 are the reverse to that in the afore-mentioned embodiment, provided that the optical reflection-absorption layer 312a is formed on the reference surface 116a side of the dielectric anti-reflection layer 312b in the light intensity ratio adjustment film 312, the same effect may be obtained as with the afore-mentioned embodiment.

Furthermore, the sample light may be not only light reflected from the surface of the sample, but also light transmitting through the sample and carrying transmissivity ratio distribution information for the sample. Furthermore, the shape of the sample is not limited to a flat surface, and may also be a spherical surface. In this case a reference surface forming the prescribed spherical shape is used.

Furthermore, the materials forming each element of the light intensity ratio adjustment filter for an interferometer are not limited to the materials of the afore-mentioned embodiment. Furthermore, the materials forming the transparent substrate are not limited to glass, and transparent (having a high optical transmissivity ratio in relation to the light used) substrate materials can be used. For example, quartz, fluorite, germanium, and silicon and the like in accordance with the wavelength of the light used.

Furthermore, the materials forming the optical reflection-absorption layer and the dielectric anti-reflection layer are not limited to the metallic materials and metallic oxide materials described above, and a variety of other optical reflection-absorption materials and dielectric materials which can prevent optical reflection can be used.

As described above, when the light intensity ratio adjustment filter for an interferometer according to the present invention is placed between the reference surface and the sample of a Fizeau interferometer, the reflectance of measured light incident at the reference surface can be improved due to the optical reflection-absorption effect of the optical reflection-absorption layer and the optical anti-reflection effect of the dielectric anti-reflection layer. Furthermore, when the light returned from the sample transmits through the filter the light can be absorbed and attenuated, and when the light returned from the sample is incident, reflection of this incident light in the direction of the sample is prevented, and multiple interference can be prevented. Thus, deterioration in the accuracy of phase information analysis due to retroreflection light on sample surface can be prevented, and the light intensity ratio of sample light and reference light at the reference surface may be readily set to be within the range (for example, between approximately 5 and $\frac{1}{5}$) centered on 1 irrespective of the reflectance of the light from the sample surface.

Therefore, since measurement is possible with the light intensity ratio adjustment filter inserted in the light path not only when measuring high reflectance samples, but also when measuring low reflectance samples, measurement with the light intensity ratio adjustment filter inserted in the light path is possible, even in cases in which when rapid measurement is required and the like.

Furthermore, since the light intensity ratio adjustment filter can be withdrawn from the light path when measuring low reflectance samples by placing the light intensity ratio adjustment filter so that it can be freely inserted and removed from the light path, the problem of superimposition of wavefront aberration (sample interference wave information noise) on the interference wave information due to a non-uniform distribution of transmissivity in the light intensity ratio adjustment film can be avoided, and highly accurate interference wave information can be obtained for low reflectance samples as necessary.

Furthermore, the benefits of the light intensity ratio adjustment filter for an interferometer can also be obtained with the interferometer of the present invention.

Furthermore, according to the method of measuring interference of the present invention, when measuring high reflectance samples, wavefront aberration (sample interference wave information noise) occurring due to a non-uniform distribution of transmissivity and the like in the light intensity ratio adjustment filter can be eliminated from the interference wave information, and highly accurate interference wave information can be obtained.

What is claimed is:

1. A light intensity ratio adjustment filter for an interferometer comprising:
    a light intensity ratio adjustment film of a multi-layered film structure comprising at least one optical reflection-absorption layer and at least one dielectric anti-reflection layer laminated in that order as seen from a reference surface of a Fizeau interferometer and attached to a side of a transparent substrate opposite a sample or to a side of the transparent substrate opposite the reference surface;
    wherein the light intensity ratio adjustment filter is placed so as to be freely inserted and removed between a sample and the reference surface of the Fizeau interferometer inducing interference between sample light from the sample and reference light from the reference surface, and obtaining interference wave information for the sample; and
    wherein the light intensity ratio adjustment film reflects part of the incident light from the surface of the transparent substrate opposite the reference surface, and after absorbing part of the remaining light, transmits the remainder towards the sample, and absorbs part of the light returned from the sample and incident from the surface side opposite the sample while controlling reflection, and transmits the remainder in the direction of the reference surface as the sample light.

2. The light intensity ratio adjustment filter for an interferometer according to claim 1, wherein the optical reflection-absorption layer comprises a metallic layer, and the dielectric anti-reflection layer comprises a metallic oxide layer.

3. The light intensity ratio adjustment filter for an interferometer according to claim 2, wherein the metallic layer comprises nickel-chrome or bismuth, and the dielectric anti-reflection layer comprises titanium oxide or bismuth oxide.

4. The light intensity ratio adjustment filter for an interferometer according to claim 1, wherein an optical anti-reflection film is attached to the surface of the transparent substrate either opposite the reference surface or opposite the sample to which the light intensity ratio adjustment film is not attached.

5. The light intensity ratio adjustment filter for an interferometer according to claim 4, wherein the optical anti-reflection film comprises a layer of alternate films of ZnS and $MgF_2$.

6. An interferometer comprising the light intensity ratio adjustment filter for an interferometer according to claim 1.

7. The interferometer according to claim 6, wherein the light intensity ratio of the reference light in relation to the sample light at the reference surface is within a range of 5 and $\frac{1}{5}$.

8. The interferometer according to claim 6, wherein the light intensity ratio adjustment filter for an interferometer can be freely inserted and removed from a light path.

9. The interferometer according to claim 6, wherein the surface of the light intensity ratio adjustment filter for an interferometer is inclined towards a surface perpendicular to an optical axis of the interferometer.

10. The interferometer according to claim 6, wherein the sample forms a spherical shape.

11. A light interference measurement method for obtaining interference wave information for a sample using the interferometer according to claim 6, comprising the steps of:
    placing a measurement value adjustment reference plate having a surface reflectance equivalent to the reference surface at sample position, and inserting the light intensity ratio adjustment filter for an interferometer in a light path between the reference surface and the measurement value adjustment reference plate, to obtain primary interference wave information;

placing the sample to be measured at the sample position, and inserting the light intensity ratio adjustment filter for an interferometer in the light path between the reference surface and the sample to be measured, to obtain secondary interference wave information; and computing the difference information between the secondary interference wave information and the primary interference wave information to obtain interference wave information for the sample to be measured.

* * * * *